United States Patent [19]

Vaseen

[11] 4,139,595

[45] Feb. 13, 1979

[54] PRODUCING NITRIC OXIDE AND NITRIC ACID

[76] Inventor: Vesper A. Vaseen, 9840 W. 35th Ave., Wheatridge, Colo. 80033

[21] Appl. No.: 875,740

[22] Filed: Feb. 6, 1978

[51] Int. Cl.² .................... C01B 21/40; C01B 21/36; B01K 1/00

[52] U.S. Cl. .................................. 423/393; 204/177; 423/400

[58] Field of Search ............... 204/164, 174, 176, 177; 250/531–541; 423/393, 235, 237, 400

[56] References Cited

U.S. PATENT DOCUMENTS

| | | | |
|---|---|---|---|
| 3,458,419 | 7/1969 | Fuhrmann et al. | 204/174 |
| 3,762,133 | 10/1973 | Merriman et al. | 55/44 |
| 3,974,193 | 9/1976 | Sikich | 55/123 |
| 4,049,398 | 9/1977 | Vaseen | 55/3 |

Primary Examiner—F. C. Edmundson

[57] ABSTRACT

This invention is based on the factors that both oxygen gas and nitrous oxides as gas are paramagnetic; as well as are quite soluble in saturated halogenated hydrocarbon liquids; whereas nitrogen is not paramagnetic; thus providing a means of separation of the oxygen and nitrous oxide from the nitrogen by high intensity magnetic forces created by an electromagnet.

The absorber liquid, saturated with dissolved oxygen and nitrous oxides, or ammonia is then ozonated using the solvent or absorber liquid dielectric as the dielectric in an ozone generator.

The effluent is stripped of nitric oxide with water to form nitric acid or by reduced pressure to recover nitric oxide.

7 Claims, No Drawings

PRODUCING NITRIC OXIDE AND NITRIC ACID

REFERENCES

James A. Brennan, et al; U.S. Pat. No. 3,015,369; Jan. 2, 1962. Vesper A. Vaseen, U.S. Pat. No. 4,049,398; May 28, 1977.

PUBLICATIONS

Solubility and Entropy of Solution of He, $N_2$, $O_2$, $C_2H_6$, $CO_2$, and $SF_6$ in various solvents; regularity of gases solubilities; Kobatake and Hildebrand; Dept. of Chem.; Univ. of Cal.; Aug. 22, 1960.

Chemistry of Organic Fluorine Compounds; Milos Hudlicky; McMillan Co.; N.Y.; 1962.

Flourine Chemistry; Ed. Dr. J. H. Simons; Research Center; Univ. of Florida; Gainsville, Florida; Academic Press; N.Y.; 1954.

Chemical Engineers' Handbook; Fifth Ed.; Perry; McGraw Hill; Sec. 14 — Gas Absorption.

BACKGROUND OF THE INVENTION

1. Field of the Invention

Nitric acid is an important industrial commodity; most of which goes into agricultural fertilizers, largely in the form of ammonium nitrate.

The alchemists of the later middle ages were acquainted with the chemical properties of nitric acid, which they called Aqua Fortis or strong water or sometimes Aqua Valens or Powerful Water. Early nitric acid was made by heating strong sulphuric acid with saltpeter.

The production of nitric acid by distilling sodium nitrage with sulphuric acid is an essentially simple operation with the formula of: (at 900° C.).

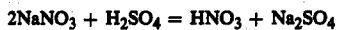

$$2NaNO_3 + H_2SO_4 = HNO_3 + Na_2SO_4$$

A lessor efficient method is: (at 200° C.).

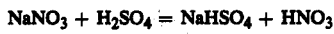

$$NaNO_3 + H_2SO_4 = NaHSO_4 + HNO_3$$

2. Description of Prior Art

Commercial nitric acid was made in a battery of retorts connected to condensers with absorption towers for recovery of vapors and a variety of accessory equipment. The retort is a large cast iron vessel, cast in two or more sections, in a brickwork foundation, and an arrangement for heating. The usual charge is 4000 pounds of nitrate of soda. Life of the retort is 550 to 600 runs.

Connection to a condensor is made by earthenware pipes. The condensor consists of one or more stands, each containing inclined glass tubes connected to a baffled stoneware header, arranged so the hot vapors made several passes. The condenser tubes are water cooled.

The usual cycle of a retort is 14 hrs. The strength of the distillate produces a 92.5% to 97.0% acid.

Nitric acid is now produced exclusively by oxidation of ammonia. Ammonia is produced by the hydrolysis of calcium cyanide ($Ca(CN)_2 + 3H_2 = CaCO_3 + 2NH_3$); LeChatelier's principal ($3H_2 + N_2 + Pres = 2NH_3$); synthesis of natural gases from organic decomposition, as well as industrial processes such as coke production, etc.

Ammonia is oxidized to nitric oxide which when mixed with water produce nitric acid.

This reaction takes place as a series of bimolecular reactions, its rate of operation controlled by the rate ammonia can be physically brought into contact with a catalyst. Ammonia conversions as high as 97.5%, with a four-layer cylindrical gauze catalyst of pure platinum, at atmospheric pressure, with 8.3% ammonia in air, preheated to give a gauze temperature of 930° C. at a rate expressed as 100 pounds of $NH_3$ per troy ounce of catalyst per (24 hr.) day.

The oxidation of $NH_3$ to NO requires a further phase; that is, the conversion of NO to $NO_2$ which will react with water to form nitric acid $HNO_3$. The essential steps are in sequence — (1) cooling the reaction products to a point which causes most of the water produced in the reaction to condense; (2) allow the gases, with a mixture of some additional air to give an excess of oxygen over that required to convert the NO to $HNO_3$; then (3) bringing the gases into contact in successive countercurrent stages with water while allowing extended time of residence to convert to $NO_2$ then NO formed upon its reaction with water.

A high pressure system also produces nitric acid. Principal advantage of the pressure system is smaller plants, and greater percentage nitric acid.

SUMMARY OF THE INVENTION

This invention relates to the removal of oxides of nitrogen from gases emitted from industrial and other sources, as well as the products of combustion; particularly internal combustion engines; thus not only removing this source of air pollution from the atmosphere; but converting them to usable nitric acid.

The family of halogenated hydrocarbon, inert liquids have "space" within the molecular structure which can be filled by various gases; such as nitrous oxides, and ammonia.

The affinity of this family of inert liquids for dissolving or absorbing gases makes them suitable for use as the "scrubbing" liquid to absorb these gases from mixtures of various gases.

Halogenated hydrocarbon liquids have "space" within the molecular structure; which can be filled up by various gases: thus this family of liquids has an affinity for dissolving or absorbing gases.

Scrubbing or intimately mixing a gas mixture stream containing various oxides of nitrogen removes them from the waste or combustion gas stream. Since most combustion is carried on with an excess of oxygen or air; a combustion gas stream also contains free oxygen which is similarly dissolved in the halogen saturated hydrocarbon liquid.

Insufficient oxygen in such a waste gas stream can be supplemented by adding air or oxygen if needed.

Both oxygen and nitrogen oxides as $NO_x$ are paramagnetic; that is in a high intensity magnetic field the molecules become polar and are attracted to the poles of the magnet at the high intensity magnetic field. Collection at the poles of excess oxygen and/or nitrous oxide will cause supersaturation of the solvent fluorocarbon liquid and thus release of these gases from the liquid. Gases so released are collected and reinserted into a solvent fluorocarbon liquid prior to ozonation of the gaseous oxygen with resultant oxidation of the nitrous oxide to nitric ozide; thence hydrolosis to nitric acid.

Gas streams containing only nitrous oxides can be scrubbed by halogenated hydrocarbon liquids, and skip the paramagnetic removal, proceeding directly with ozonation to produce nitric acid.

Normal design uses the paramagnetic quality of the oxygen and nitrous oxide to concentrate and purify them as a percentage of the solvent liquid, thence proceed to use the solvent liquid, which is also a dielectric, as the dielectric in an ozone generator. The concentrated dissolved oxygen in the solvent, carrier dielectric liquid; when in the gap between two electrodes of a high voltage (20,000 ± V) or area of a corona due to the alternating current or pulsating current across the dielectric liquid between the electrodes, converts the oxygen to ozone.

The usual conversion of oxygen to ozone in a dry gas generator is in the range of (1) one to (2) two percent ($O_3$) ozone; however, in the wet ozonation of the oxygen along with the concentrated nitrous oxides; the ozone also immediately reacts with the nitrous oxide converting it to nitric oxide; thus permitting additional ozone formation; and more efficient converstion of electrical energy to chemical energy; and less loss to heat energy than the use of a dry gas ozonator.

Water is non-miscible with the solvent or absorber dielectric liquid, therefore, the nitric oxide is retained in the liquid as dissolved or absorbed gas; the greater the pressure of operation the greater the solvency of the liquid for retaining the dissolved nitric oxide gas.

The quantity of water used is dependent on the strength of the acid desired as product acid.

Following the ozonator the nitrogen dioxide saturated solvent or absorber dielectric liquid is intimately mixed with the amount of water required to react with the nitric oxide and produce the strength of nitric acid desired.

The mixture of nitric acid and absorber liquid is cooled by heat exchanger to ambient or other desired temperature, with the exothermic heat used when possible.

The pressure, if a pressure operated system, is then released and the cooled mixture of nitric acid and absorber liquid gravity separated, due to their varied specific gravities; with product acid to storage and use; and the absorber liquid returned for recycle use in the scrubber.

DESCRIPTION OF THE PREFERRED EMBODIMENTS

The gases absorbent dielectric liquid is preferably on which has physical/chemical chemical characteristics as follows:

1 — Boiling points in excess of 100° C. (212° F.)
2 — Low vapor pressures - non volatile
3 — Specific heat capacities greater than 0.20
4 — Superatmospheric critical pressures
5 — Nonmiscible with water
6 — Non toxic to organic life
7 — Stable chemical/physical properties
8 — Reusable for inumerable cycles
9 — Non-biodegradable
10 — Non flammable - no flash point
11 — Affinity for dissolving oxygen and ozone
12 — Preferably a halogen saturated hydrocarbon.

The preferred solvent or absorber liquids are the fully halogenated, low molecular weight saturated hydrocarbons or mixtures thereof, in which the molecule contains at least six carbon atoms and at least one fluorine atom, the remaining substitute atoms being another halogen or nitrogen.

Preferably the gases stream being scrubbed for removal of nitrogen oxides is one of the high concentration nitrous oxides or ammonia types, for example:

More than 90% of the manmade nitrogen oxides ($NO_x$) in the United States comes from combustion in stationary sources and from transportation vehicles. Though these total quantities may be but 10% of the total, high concentrations of $NO_x$ can be emitted from some industrial processes.

Important industrial sources of nitrogen oxides are tail gases from nitric acid manufacturing units, sulphuric acid plants, manufacture of cellulose nitrate, nitrobenzene, nitrofertilizers, metal dissolving and many others.

SCRUBBER OR GASES ABSORBER

A scrubber mechanism is preferably one which intimately co-mingles the gases stream with the selected absorbant dielectric fluorocarbon liquid. The scrubber liquid being intimately co-mingled with the gases long enough to absorb 90 to 95% (or more) of the nitrogen oxides or ammonia and excess oxygen (air).

Both high energy and low energy scrubbers can be used, for demonstration herein of principals involved I have selected to use a low energy scrubber, that is; one which pumps a "spray" of scrubber liquid through the gaseous stream at a rate of 3 to 15 gallons per each 1000 ACFM at STP. Since the object of the invention is to ozonate-ozidize the various nitrogen oxides captured by scrubber and/or paramagnetic accumulation; then the quantity of oxygen the absorben dielectric liquid absorber is a deciding factor in any system design.

PARAMAGNETIC ACCUMULATION

U.S. Pat. No. 4,049,398, issued May 28, 1977; V. A. Vaseen teaches the art and science of "the separation of oxygen from air by means of dissolving air in a nonmagnetic, inert liquid and then paramagnetically collecting the oxygen from the liquid."

The above invention concerns itself with the production of gaseous oxygen. This invention concerns itself with the same principals, except the paramagnetic accumulation of both nitrogen oxide and oxygen from the scrubber liquid, is for the purpose of separating the nitrogen oxide and oxygen from the scrubber liquid by concentrating the dissolved gases contained therein, but not to the point of super saturation and release of gases fluid from the liquid. Should this occur, however, the collected released purified gases are reabsorbed in the dielectric liquid prior to the ozonator.

The scrubber liquid which has absorbed the nitrogen oxides and oxygen from the subject gas stream is caused to pass through preferably a high intensity, 10 to 100 kOe, magnetic field. Both the north and the south pole of the electromagnet attract the paramagnetic nitrogen oxide and oxygen, absorbed or dissolved in the dielectric liquid.

Gaseous oxygen has a greater magnetic susceptibility than the nitrogen oxide at ambient as well as various other temperatures as illustrated by the following abstracted Table from "Handbook of Materials Science", Vol. I., Edited by C. T. Lyndi; CRC Press 1974.

OXYGEN HAS MAGNETIC SUSCEPTIBILITY
Gaseous — 293K + 3,449 ($10^{-6}$cgs)
Liquid — 90.1K + 7,699 ($10^{-6}$cgs)
Liquid — 70.8K + 8,685 ($10^{-6}$cgs)

| NITROGEN HAS MAGNETIC SUSCEPTIBILITY | | | |
|---|---|---|---|
| Gas | Ambient K | −12.0 | ($10^{-6}$ cgs) |
| Gaseous | NO | 293K | +1,461 |
| | NO | 203.8K | +1,895 |
| | NO | 146.9 | +2,324 |
| | $NO_2$ | 408 | +150 |
| | $N_2O$ | 285 | −18.9 |
| | $N_2O_3$ | 291 | −16.0 |
| | $N_2O_3$ | 303.6 | −22.1 |
| | $N_2O_4$ | 295.1 | −23.0 |
| (Aqueous) | $N_2O_5$ | 289 | −35.6 |

The use of oxygen preferably as a controlling factor assures the greater efficiency in accumulation of the nitrogen oxide.

A physical means of separating the liquid adjacent to the poles of the magnet from the liquid from which the gases have been paramagnetically stripped, is necessary. Preferably a side stream of liquid adjacent to both poles is then transferred through a heat exchanger to cool the dielectric liquid prior to its introduction to the ozonator; the nitric acid stripped stream of dielectric liquid is also heat exchanger cooled prior to return to the scrubber.

OZONATOR

The ozonator is the heart and key to the whole process by this invention of converting nitrogen oxides to nitric oxide thence with water to nitric acid.

When a high voltage, preferably in the range of 5000 to 50,000 volts, is imposed across a discharge gap in the presence of an oxygen containing gas, ozone is produced. This basic method of production is inherently inefficient. About 10% of the energy supplied is used in production or conversion of oxygen to (1%) ozone. The 90% is lost as light, sound and primarily heat.

The decomposition of ozone back to oxygen is greatly accelerated with increasing temperature, so that all high concentration ozonators must contain a heat removal method.

The gas flow through the gap removes only enough heat to allow production of ozone in concentrations of less than a few tenths of a percent. Ozone production in higher concentrations must be provided a heat removal means.

If a clean, dry, oxygen-rich gas is fed to the ozone generator and an efficient method of heat removal is available, then the production of ozone from a corona under optimum conditions can be represented by the following relationships.

$$V \alpha\, pg$$
$$\frac{Y}{A} \alpha f \Sigma \frac{\epsilon}{d} V^2$$

Y/A = ozone yield per unit area of electrode surface under optimum conditions.
V = Voltage across the discharge gap (peak)
p = Gas pressure in the discharge gap (psig)
g = Width of the discharge gap
f = Frequency of the applied voltage
$\epsilon$ = Dielectric constant of the dielectric
d = Thickness of the dielectric This invention uses a liquid dielectric preferably a fluorodated hydrocarbon liquid, containing dissolved oxygen which alters none of the above relationships; except to increase the efficiency of energy to ozone, as such a liquid type ozonator operates as though the oxygen gas is a gas in a fluid media rather than a liquid media.

Three types of ozonator mechanical configurations are currently used. These are the Otto plate type, the Tube type, and the Lowther-plate (heat removing) type.

All these mechanical configurations are used with the liquid dielectric containing dissolved oxygen; by encasing the electrodes in such a manner as to confine the liquid dielectric under pressure between the electrodes while it is passing through the machine.

The absorber mechanism for scrubbing a gaseous vent containing nitrous oxides and air is preferably one which intimately mixes the nitrous oxide and air gases stream with the fluorodated hydrocarbon liquid absorber liquid for example the perfluorocarbon $C_{10}F_{18}$ for a period of time, for example (10) ten seconds. The quantity of absorber liquid used is, for example twice the quantity required for theoretical absorbtion, or 100 GPM, when absorbing 100 pounds of oxygen and 93.75 pounds of various nitrous oxides or $NO_x$'s. This quantity is used when the pressure of operation of the scrubber mechanism, is for example, 3 atmospheres.

A side stream of the absorber liquid is removed from the scrubber mechanism still under three atmospheres of pressure and injected into the ozonater machine.

NITRIC ACID

The object of the ozonation is to convert NO to $NO_2$ as per the following equation:

$$NO + \tfrac{1}{2} O_2 = NO_2$$

However, since this invention involves ozone the equation is:

$$3NO + O_3 = 3NO_2$$

Nitrogen dioxide absorption into water to produce nitric acid is a series of reactions, probably as follows:

$$2NO_2 + H_2O = HNO_3 + HNO_2$$

$$2HNO_2 = H_2O + NO + NO_2$$

$$3NO_2 + H_2O = 2\,HNO_3 + NO$$

$$2NO + O_2 = 2NO_2$$

$$2NO_2 = N_2O_4$$

The oxidation of nitric oxide has several unique characteristics. Kinetically, the reaction is third order and, in addition, its reaction rate constant decreases with increasing temperature. The time required to achieve a given conversion decreases with the square of the pressure.

The nitrogen compounds of major interest in production of nitric acid are: nitric oxide, nitrogen dioxide, dinitrogen tetroxide, nitrogen trioxide, nitric acid, and nitrous acid. The essential chemical reactions which occur during the absorbtion of nitrogen oxides from mixtures of oxides are equated as follows:

$$2NO_2 + H_2O = HNO_3 + HNO_2 \qquad (a)$$

$$2HNO_2 = H_2O + NO + NO_2 \qquad (b)$$

$$3NO_2 + H_2O = 2HNO_3 + NO \qquad (c)$$

$$2NO + O_2 = 2NO_2 \qquad (d)$$

$$2NO_2 = N_2O_4 \qquad (e)$$

Equation (c) represents the overall reaction when nitrogen dioxide is brought to equilibrium with liquid water and is obtained by the addition of reactions (a) and (b).

The equilibrium constant for reaction (c) is given by:

$$K = \frac{P_{NO} P^2 HNO_3}{P^3 NO_2 P_{H_2O}} = (K_1)(K_2)$$

Where
$K_1 = P_{NO} \div P^3 NO_2$
$K_2 = P^2 HNO_3 \div P_{H_2O}$

Values for K have been established as follows for: $2NO_2 = N_2O_4$

| Temp. °F | Equilibrium Constant - $K_{ATM}$ |
|---|---|
| 48 | 26.80 |
| 84 | 5.13 |
| 116 | 1.39 |
| 175 | 0.414 |
| 230 | 0.204 |
| 266 | 0.168 |

Values for K have been established as follows for: $3NO_2 (Gas) + H_2O (Gas) = 2HNO_3 (Gas) + NO(Gas)$

| T°K | KATM |
|---|---|
| 275.0 | $3.78 \times 10^{-2}$ |
| 293.1 | $1.37 \times 10^{-2}$ |
| 298.1 | $1.05 \times 10^{-2}$ |
| 300.0 | $9.51 \times 10^{-3}$ |
| 350.0 | $1.01 \times 10^{-3}$ |
| 400.0 | $1.87 \times 10^{-4}$ |
| 450.0 | $4.36 \times 10^{-5}$ |
| 500.0 | $1.65 \times 10^{-5}$ |

Low temperature benefits absorption. There are several reasons for this beneficial effect. The oxidation to nitric oxide has a negative temperature coefficient, with the reaction more rapidly and more efficiently at low (ambient) temperatures. At low temperature the equilibrium in the gas phase shifts from nitrogen dioxide to dinitrogen tetroxide and the solubility of dinitrogen tetroxide in nitric acid is also increased. This results in a higher dinitrogen tetroxide concentration at the liquid-gas interface and more rapid transfer across the liquid film.

Increased pressure also results in improved absorber performance. The rate of nitric oxide oxidation increases with increased pressure. Also, the rate of physical absorption increases with increased pressure and the chemical equilibrium also shifts, making higher strength acid possible.

The following table illustrates these relationships:

| (REACTION TIME VS. PRESSURE & EFFICIENCY) (IN SEC'S) | | | | | |
|---|---|---|---|---|---|
| HNO₃ Conc. | (PRESSURE IN ATMOSPHERES) At 21° C | | | | |
| % By Wt. | 10 | 20 | 30 | 40 | 50 |
| 54 | .1 | — | — | — | — |
| 56 | 1 | — | — | — | — |
| 58 | 3 | — | — | — | — |
| 60 | 5 | .1 | — | — | — |
| 62 | 7 | 3 | .1 | — | — |
| 64 | 10 | 5 | 3 | .1 | .1 |
| 66 | 12 | 8 | 6 | 5 | 3 |
| 68 | 15 | 12 | 9 | 8 | 7 |
| 70 | 17 | 14 | 13 | 12 | 11 |
| 72 | 19 | 17 | 16 | 15 | 15 |

Oxidation of NO to $NO_2$ is exothermic. The heat of formation of nitric oxide (NO) is +21,600 cal/g mole. The heat of formation of $NO_2$ is +8,060 cal/g mole. The exothermic heat which must be removed to prevent temperature rise of the process system is (−)13,540 cal/g mole ($NO_2$).

For example 100 g moles of gas containing 10% by volume NO and 7% $O_2$ can be expected to react chemically to 95% of reaction completion. The remainder of the gas is nitrogen.

The molar heat capacity of the gas mixture is 7.0 cal/g mole /° C. In the gas mixture there are 10g mols of NO which will produce 9.59 mols of $NO_2$. The amount of heat produced is therefore 129,000 cal. If measures are not taken to remove the heat the gas mixture (without being carried in a liquid fluorocarbon dielectric) would increase in temperature, for example to 184° C.

Retention time, for the dielectric fluorocarbon liquid, between the electrodes (in the corona) of the ozonator is determined from the reaction time of chemical conversion. Thus for example, a 60% nitric acid concentration by weight and a pressure system of 20 atmospheres and ambient temperature of 21° C.; the liquid must remain for 0.1 seconds.

The ozone generator is designed, for example with 40,000 square inches of opposing electrode surface with a 0.10" gap; to receive a slip stream off the scrubber of oxygen and nitrous oxides loaded absorbent liquid at a rate in concert with the absorption capacity of the liquid; for example 100 GPM.

A voltage of 20,000 RMS, for example, with a fluctuating current, 60 Hz; produces 50 pounds of ozone per hour; which immediately reacts with 93.75 pounds/hr of absorbed nitrous oxides to produce 143.75 pounds per hour of nitric oxide ($NO_2$).

Power required for the ozonator is, for example 40,000 watts. Heat is produced at a rate of, for example 2000 Btu/minute. The 100 GPM of absorber liquid absorbs 400 Btu per degree F. and leaves the ozonator, for example 5° F. warmer than it enters, due to power loss to heat.

Retention time in the ozonator is controlled by the rate of flow of the absorber liquid through the ozonator individual electrode pairs or cells; for example one gallon per minute per each 100 square inches of electrode.

A mixing mechanism, for instance a Venturi, is used in the effluent line from the ozonator to add water, which reacts with the ($NO_2$) nitric oxides to produce by chemical formation nitric acid and some nitrous oxide.

Water is added, for example, 18.75 pounds which reacts to produce, for example, 131.24 pounds of nitric acid with a specific gravity of 1.5129 (12.63#/gal) or 49.2 Be.

Preferably, the nitric oxides are separated from the dielectric liquid by addition of water sufficient to produce strength of acid desired; due to non-miscibility of water and acid with the dielectric liquid.

The water addition step can be skipped and the nitric oxide gases stripped from the dielectric liquid, by reduction in pressure and/or heating.

Cooled, water treated, mixed, depressurized to atmospheric, absorber liquid as removed from the ozonator is separated in a gravity clarifier or centrifuge. The absorber liquid has a specific gravity of for example of 1.88. The nitric acid, produced in this example, has a specific gravity as 100% acid of 1.5129 which rises to the surface and floats on the absorber liquid. The acid is decanted off the top to storage, concentration and/or use.

Due to the difference in the specific gravities of the acid and absorber liquids; clarification is accomplished in a short period of time; for example, ten (10) minutes. A surface settling rate of less than 1000 gallons per square foot per day; for the acid is sufficient. Overflow weir rate should be less than 15000 gallons per foot of length per day.

What is claimed is:

1. A method for producing nitric acid which comprises scrubbing a gas containing nitrogen oxides and ammonia with a liquid halogenated hydrocarbon which is a dielectric to dissolve the nitrogen compounds, adding oxygen to the solution, passing the resulting solution through an ozonizer to oxidize the nitrogen compounds to nitric oxide, extracting the effluent from the ozonizer with water to form nitric acid.

2. A method according to claim 1 in which the pressure is superatmospheric.

3. A method according to claim 1 in which the stripped halogenated hydrocarbon is recycled.

4. The method of claim 1 in which the added oxygen is pure oxygen.

5. The method of claim 1 in which the added oxygen is air.

6. A method for producing nitric oxide which comprises scrubbing gases containing ammonia and oxides of nitrogen with a liquid halogenated hydrocarbon which is a dielectric to dissolve the nitrogen compounds, adding oxygen to the solution, passing the resulting solution through an ozonizer to oxidize the nitrogen compounds to nitric oxide, recovering nitric oxide from the effluent from the ozonizer and collecting the nitric oxide.

7. The process of claim 6 in which the absorption and ozonization are carried out under superatmospheric pressure and the nitric oxide is removed under reduced pressure.

* * * * *